(12) United States Patent
Prins et al.

(10) Patent No.: US 6,383,601 B2
(45) Date of Patent: *May 7, 2002

(54) HONEYCOMB STRUCTURE AND METHOD OF MANUFACTURING HONEYCOMB STRUCTURES

(75) Inventors: Menno W. J. Prins; Petrus W. J. Linders; Johannes C. Jans, all of Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,779

(22) Filed: May 21, 1999

(30) Foreign Application Priority Data

May 22, 1998 (EP) .............................. 98201706
Nov. 25, 1998 (EP) .............................. 98203986

(51) Int. Cl.[7] .......................... B32B 3/12; B32B 17/10; B32B 31/00
(52) U.S. Cl. ......................... 428/118; 428/116; 156/197
(58) Field of Search ................................ 428/586, 593, 428/116, 118; 228/118, 181; 156/197

(56) References Cited

U.S. PATENT DOCUMENTS

| | | | | |
|---|---|---|---|---|
| 2,212,481 A | * | 8/1940 | Sendzimir | 428/593 |
| 4,434,930 A | * | 3/1984 | Trenkler et al. | 228/118 |
| 4,957,577 A | * | 9/1990 | Huebner | 156/197 |
| 5,316,203 A | * | 5/1994 | Rowe et al. | 228/118 |
| 5,421,935 A | * | 6/1995 | Dixon et al. | 156/197 |

FOREIGN PATENT DOCUMENTS

| | | | |
|---|---|---|---|
| EP | 0336722 A2 | 10/1989 | B29D/31/00 |
| WO | WO9301048 | 1/1993 | B32B/3/12 |

* cited by examiner

*Primary Examiner*—John J. Zimmerman
(74) *Attorney, Agent, or Firm*—John Vodopia

(57) ABSTRACT

The invention relates to a method of manufacturing honeycomb stuctures in which multiple foils are welded together by means of thermal compression and the multiple foils form the honeycomb structure in the expanded condition. The bonding locations, where the foils are fused together, are defined by inserting a structured separating layer between the foils. The invention also relates to, for example, luminaries and x-ray apparatus using a honeycomb structure so manufactured.

10 Claims, 2 Drawing Sheets

HONEYCOMB STRUCTURE AND METHOD OF MANUFACTURING HONEYCOMB STRUCTURES

BACKGROUND OF THE INVENTION

1. Field of the Invention

The invention relates to a method of manufacturing honeycomb structures which includes the following steps:

connecting a plurality of foils to one another so as to realize a stack of interconnected foils which form a honeycomb structure in the expanded condition, the foils being fused at various bonding locations, and expanding the plurality of foils in a direction transversely of the surface, to the foils in order to form the honeycomb structure.

The invention also relates to a honeycomb structure which includes a plurality of foils which are interconnected in different bonding locations by welding.

2. Description of Related Art

The method and the honeycomb structure of the described kind are known from international patent application WO 93/01048. Because of their low weight and unique structural properties, honeycomb structures are universally used in industrial applications. Honeycomb structures made of comparatively thin foils are widely used because of their low weight and ability to withstand high compression loads. Such honeycomb structures are used, for example in aircraft components and running shoes.

Honeycomb structures are also used in, for example an X-ray examination apparatus. Such an X-ray examination apparatus includes an adjustable X-ray filter. The adjustable X-ray filter includes a bundle of capillary tubes which are formed by the honeycomb structure. The capillary tubes may be completely or partly filled with an X-ray absorbing liquid. Furthermore, one end of the capillary tubes is connected to a reservoir containing an X-ray absorbing liquid. An electric voltage is applied across the tubes and the X-ray absorbing liquid in order to fill the capillary tubes. This enables adjustment of a two-dimensional dimensional intensity profile of an X-ray beam traversing the X-ray filter. Honeycomb structures are also used as light diffusers in luminaries.

The known method realizes the honeycomb structure by expansion of interconnected foils. A stack of foils is formed by successively arranging first and second foils against one another and by heating the bonding locations via the second foil, so that the first and second foils start to melt. When the desired melting depth has been reached in the first foil, heating is terminated and the foils are cooled. Subsequently, a next foil is placed on the stack. The described process steps are repeated until the stack contains a number of foils which suffices to realize a honeycomb structure comprising the desired number of channels. After the plurality of foils has been interconnected in this manner, the stack of foils is expanded by pulling in order to form the honeycomb structure.

It is a drawback of the known process that it is difficult to apply the appropriate amount of heat to the bonding locations on the second foils so as to achieve the desired melting depth and to prevent the foils from being completely connected to one another.

SUMMARY OF THE INVENTION

It is an object of the invention to provide to provide a method where the amount of heat of heat to be applied is not critical and the foils are not completely connected to one another. To achieve this, the method according to the invention is characterized in that it includes a step for providing a structured separating layer on at least one side of the foil in order to realize the bonding locations on the foil. Other attractive versions of the method according to the invention are disclosed herein. The separating layer is structured in such a manner that it comprises openings which constitute the bonding locations. Neighboring foils to both sides of the relevant separating layer can contact one another via the openings. When pressure is exerted on the stack of foils with the separating layers inserted between individual foils, the neighboring foils are bonded together at the areas where they contact one another at the bonding locations in the separating layers. The separating layers prevent the bonding of neighboring foils outside the bonding locations. For example, the bonding locations are formed by narrow strips which form the bonding seams along which the neighboring foils are fused by thermal compression so that they are bonded together along said bonding seams. The insertion of the structured separating layer also offers the advantage that the process of bonding the foils in the stack can be accelerated. Furthermore, the structured layer can be provided, for example by providing a metal layer on the foil and by locally removing material of the metal layer so as to define the bonding locations. A further advantage resides in the fact that the foils to be used may be thin. For example, use is made of foils having a thickness of approximately 5µm. Furthermore, it is advantageous to use foils having a high mechanical strength. It has been found that polypropylene sulphon (PPS) is a suitable material for the foils; polyethyleneterephthalate (PETP), polyethylene and polyesters are also suitable materials for forming the foils.

The stacked foils are preferably expanded by clamping the foils transversely to the plane of the foils. As a result, neighboring foils locally move away from one another at the areas where they are not interconnected. The expanded, stacked foils can be maintained in the expanded condition by keeping them mechanically clamped. Manufacture of the stacked foils can also be maintained in the expanded condition by drastically reducing the elasticity of the foils, after clamping, by temporary heating or irradiation by means of X-rays or ultraviolet radiation. The pattern of cross-sections of the channels in the honeycomb is determined by the degree of expansion of the stack of foils transversely of the foil surface, the spacing of the bonding seams in the direction parallel to the surface of the foils, the seams along which the foils are attached to one another, and the width of said bonding seams. If the width of the bonding seams in a regular pattern between adjoining foils is approximately three times smaller than their spacing and if the stack of foils is expanded only slightly, a more or less eye-shaped pattern will be obtained; if the stack is expanded further, a hexagonal honeycomb pattern arises and if the stack is expanded even further, a pattern of rectangles having slightly rounded corners is obtained. Using a honeycomb pattern it is achieved notably that the mechanical strength of the expanded stack of foils is very high. When the width of the bonding seams in a regular pattern between adjoining foils is approximately two times smaller than their spacing, a rhombic pattern (with slightly rounded corners) or a pattern of eyes will be obtained, depending on whether the stack of foils is expanded more or less. When the bonding seams are much narrower than their spacing and the stack of foils is expanded only slightly, an eye-shaped pattern of channel cross-sections is formed. The directions of the channels in the expanded foils are dependent on the directions of the bonding seams relative to one another in the expanded foils. For example, when straight or curved, mutually parallel bonding seams are used, straight and curved channels, respectively, are formed and when the bonding seams are made to converge towards one another, tapered channels are formed. Furthermore, it is also possible to use bonding seams which are parallel in pairs while individual pairs of bonding seams enclose a small angle relative to one another. This yields filter elements in the form of channels; individual channels then enclose an angle relative to one another. It is also possible to realize other shapes by non-parallel expansion of the outermost foils.

A special version of the invention is characterized in that the step for realizing the structured separating layer comprises two sub-steps: a first sub-step for providing a separating layer on the at least one side of the foil, and a second sub-step for providing structures in the separating layer by the removal of material from the separating layer in order to realize the bonding locations. The bonding locations on the foils are thus defined. Material can be removed from the separating layer, for example by laser ablation.

A further method according to the invention is characterized in that it includes two sub-steps: stacking the plurality of foils and heating the stack to a temperature beyond the melting point of the foils. The process for realizing the stack of bonded foils can thus be substantially accelerated, because first all foils are stacked on one another and subsequently the entire stack of foils is heated to a temperature beyond the melting point of the foils in a single further step. Due to the presence of the structured separating layer, the material of the foils melts only in the bond locations defined by the structured separating layer.

The invention also relates to a honeycomb structure which includes a plurality of foils which are bonded to one another at various bonding locations by welding. The honeycomb structure according to the invention is characterized in that the bonding locations are separated from one another by a structured separating layer provided on at least one side of the foil.

A further embodiment of the honeycomb structure according to the invention is characterized in that the structured separating layer contains a metal having a thickness in a range of less than 500 nm. An example of such a metal includes aluminum.

The invention also relates to a diagnostic X-ray apparatus provided with an X-ray filter. The diagnostic X-ray apparatus according to the invention, is characterized in that the X-ray filter includes a honeycomb structure having a structured separating layer.

The invention also relates to a luminary provided with a diffuser. The luminary according to the invention is characterized in that the diffuser includes a honeycomb structure having a structured separating layer.

BRIEF DESCRIPTION OF THE DRAWING

The above and other, more detailed aspects of the invention will be described in detail hereinafter, by way of example, with reference to the drawing.

In the drawing.

DETAILED DESCRIPTION OF THE PREFERRED EMBODIMENT

The method manufacturing the honeycomb structure will be described in detail hereinafter with reference to the FIGS.

Figure 1:
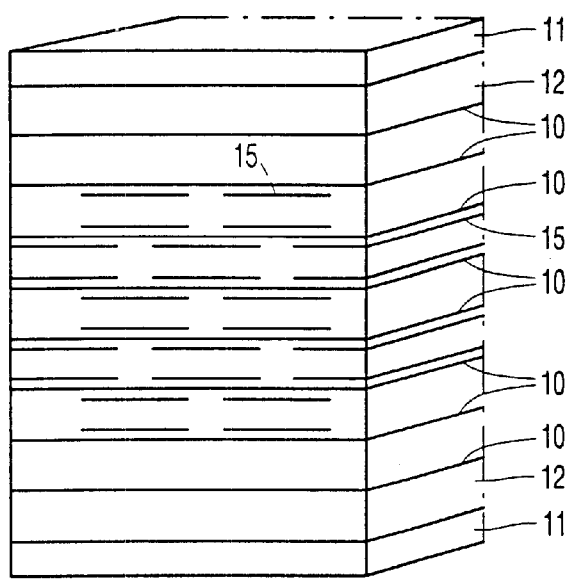
FIG. 1 shows a stack of foils.

1 and 2. FIG. 1 is a diagrammatic front and side view of an example of a stack of foils used to form the honeycomb structure for use in the X-ray filter. The individual foils 10 in the stack alternate with structured separating layers 15. The thickness of the foils amounts to, for example approximately 5 $\mu$m. Preferably, the separating layers 15 are strips of aluminum having a thickness in a range of from approximately 5 to 500 nm; preferably, aluminum strips having a thickness of approximately 20 nm are used. When the foils are heated under pressure to a temperature beyond the melting point, the neighboring foils are partly fused in bonding locations where no aluminum is present between the neighboring foils. The neighboring foils are locally bonded to one another by way of such a thermal compression treatment. At the areas where a strip of aluminum is present between neighboring foils, the foils are not bonded by the thermal compression treatment. It has been found that foils having a melting point in the range of from 70 to 500° C. are very suitable for carrying out such thermal compression.

Figure 2:
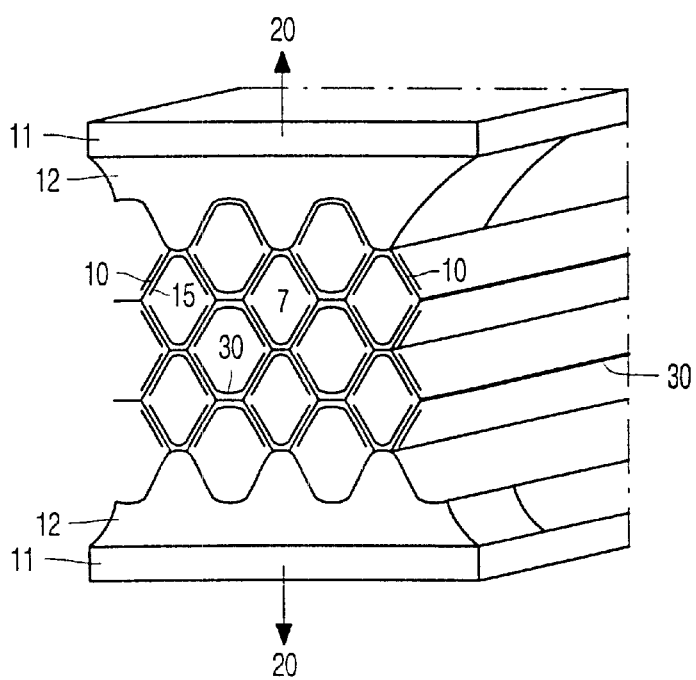
FIG. 2 shows a honeycomb structure.

The honeycomb structure 30 shown in FIG. 2 has been formed by expanding the stacked foils 10. The stack of foils 10 has been expanded in the direction of the arrows20. Expansion is realized, for example by pulling one or both rigid plates 11 in the direction of the arrows. Buffer members 12 are provided between the stack of foils 10 and the respective rigid plates 11. The expansion of the stack of foils locally creates spaces between neighboring foils, i.e. at the areas where they are not bonded to one another. When use is made of parallel separating strips, approximately parallel bonding seams along which the neighboring foils are bonded to one another are formed by thermal compression. As a result of such approximately parallel bonding seams, the spaces between the foils are shaped as capillary tubes which extend approximately perpendicularly to the plane of drawing and parallel to the bonding seams. The degree of expansion of the stack of foils determines, in conjunction with the dimensions of the bonding seams and the spacing of the bonding seams, the dimensions of the capillary tubes. As a result of the expansion in the direction transversely of the foils, the buffer members 12 are slightly contracted in the direction parallel to the foils. It is thus achieved that the stack of foils is expanded mainly transversely of the foils and the size of the local spaces between the foils is uniform over the honey comb structure.

Figure 3:
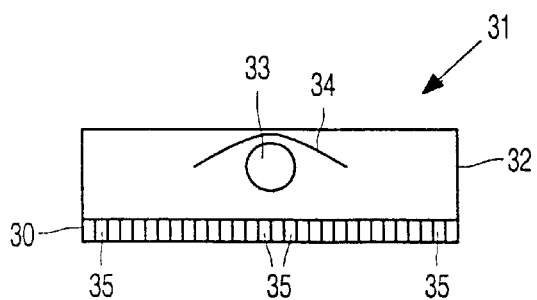
FIG. 3 shows the use of a honeycomb structure according to the invention in a luminary.

In order to realize the structured separating layer, on one side of the foils there is provided a metal layer having a thickness of, for example 20 nm. This metal layer can be deposited, for example by way of a vapor deposition process. Subsequently, the metal is removed from the foil at the area of the bonding locations by means of, for example laser ablation. Other possibilities for locally removing the material are, for example, wet chemical etching or the use of a shadow mask vapor deposition method. In order to make the temperature adjustment even less critical during the heating and bonding of the stack of foils, preferably both sides of the foils are provided with the structured separating layer. FIG. 3 shows the use of the honeycomb structure 30 as a diffuser in a luminary 31. The luminary 31 includes a housing 32, a lamp 33, a reflector 34 and a honeycomb structure 30. The lamp 33 is, for example a fluorescent tube. The reflector 34 is shaped, for example as a parabolic reflector which is arranged in the housing 32 or is integral with the housing. The fluorescent tube 33 is mounted in the housing 32 near a focal line of the parabolic reflector 34. The honeycomb structure 30 is provided in a window of the housing 32 opposite the parabolic reflector 34. The channels 35 of the honeycomb structure 30 are oriented, for example parallel to one another and in the direction of an object to be illuminated (not shown). The length of the channels amounts to, for example 2 mm and their diameter is, for example 1 mm. In order to enhance the efficiency, the inner side of the channels is preferably provided with a diffusely dispersive reflection layer. A high-efficiency diffuser is thus obtained. In addition to the described application, it is also possible to bend the honeycomb structure so that exit openings of the channels, via which light rays emanate from the luminary, are directed towards a focal line or a focal spot.

Figure 4:
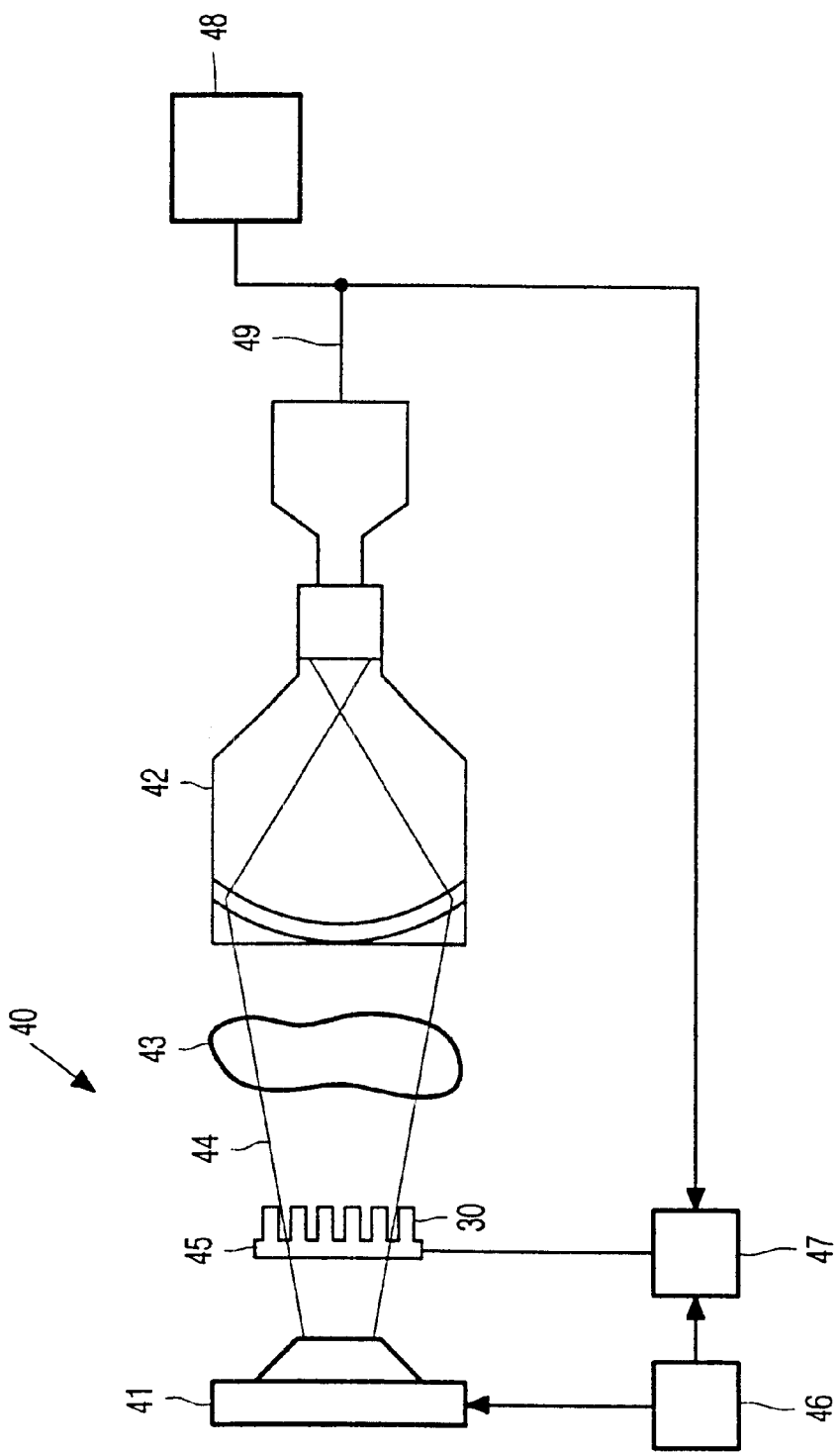
FIG. 4 shows the use of a honeycomb structure according to the invention in an X-ray filter.

FIG. 4 shows an application of a honeycomb structure 30 in an X-ray filter 45 of an X-ray examination apparatus 40. Such an X-ray examination apparatus 40 includes an X-ray source 41, an X-ray detector 42, a power supply unit 46 delivering a voltage for the X-ray source 41, a monitor 48, an X-ray filter 45 and a control unit 47. The object 43 to be examined is arranged between the X-ray source 41 and the X-ray detector 42. The X-ray detector 42 converts an X-ray beam 44 having traversed the object 43 into an electric image signal 49. The image signal 49 is then displayed on a monitor 48. In order to attenuate the X-ray beam 44 locally so as to adjust a two-dimensional intensity profile, an X-ray filter 45 is arranged in the X-ray beam 44 between the X-ray source 41 and the object 43. The X-ray filter 45 comprises a large number of filter elements. A filter element preferably includes a capillary tube. The capillary tubes (not shown in FIG. 4) are formed by the honeycomb structure 30. The length of the capillary tubes amounts to, for example 25 mm and their diameter to, for example 275 $\mu$m. The capillary tubes communicate, by way of a first opening, with a reservoir (not shown in FIG. 4) which contains an X-ray absorbing liquid, for example an aqueous solution of a lead salt. The X-ray absorptivity of the X-ray filter 45 can be adjusted via the control unit 47 by applying electric voltages across the inner side of the capillary tubes of the X-ray filter 45 and the X-ray absorbing liquid. This is because the adhesion of the X-ray absorbing liquid to the inner side of the capillary tubes is dependent on the electric voltage applied across the inner side of the capillary tubes and the X-ray absorbing liquid. The capillary tubes are filled with a given quantity of X-ray absorbing liquid in dependence on the electric voltage present across the individual capillary tubes and the X-ray absorbing liquid. Because the capillary tubes extend approximately parallel to the X-ray beam, the X-ray absorptivity of the individual capillary tubes is dependent on the relative quantity of X-ray absorbing liquid present in the capillary tube.

Other applications of the honeycomb structure according to the invention are, for example its use as a collimator for X-rays in an X-ray examination apparatus. Another application is, for example its use as an anti-scatter grid in an X-ray examination apparatus.

What is claimed is:

1. A method of manufacturing honeycomb structures comprising:

providing structured separating layers on at least one side of each of a plurality of foils, fusing the plurality of foils and structured separating layers against one another to realize a compressed stack of interconnected foils and structured separating layers to physically connect the foils to corresponding foils at bonding locations of the structured separating layers, which compressed stack of foils and separating layers form a honeycomb structure in the expanded condition, and expanding the compressed stack of interconnected foils and structured separating layers in a direction transversely of the surface of the foils in order to form the honeycomb structure.

2. A method as claimed in claim 1, wherein the step for providing the structured separating layers further comprises:

providing structures in the structured separating layers by the removal of material from the structured separating layer thereby forming openings to realize the bonding locations.

3. A method as claimed in claim 1, wherein the step for fusing the plurality of foils and structured separating layers further comprises:

stacking the plurality of foils and structured separating layers, and heating the stack to a temperature beyond the melting point of the foils.

4. An expanded honeycomb structure comprising a plurality of foils and structured separating layers, which foils are fused to one another at various bonding locations provided by the structured separating layers, wherein the bonding locations are separated from one another by the structured separating layers which are provided on at least one side of each of the plurality of foils.

5. An expanded honeycomb structure as claimed in claim 4, wherein neighboring foils are locally connected to one another along bonding seams, the ratio of the width of the individual bonding seams to the distance between neighboring bonding seams being in the range of from 0.1 to 0.4.

6. An expanded honeycomb structure as claimed in claim 4, wherein the structured separating layers containing a metal having a thickness in a range of more than 5 nm and less than 500 nm.

7. An expanded honeycomb structure as claimed in claim 6, wherein the metal contains aluminum.

8. An expanded structure of claim 5 wherein the ratio of the width of the individual bonding seams to the distance between neighboring bonding seams is from approximately $\frac{1}{4}$ to approximately $\frac{1}{3}$.

9. A diagnostic X-ray apparatus comprising an X-ray filter, including a honeycomb structure, comprising a plurality of foils and structured separating layers, which foils are fused to one another at various bonding locations, the bonding locations being separated from one another by the structured separating layers which are provided on at least one side of each foil.

10. A luminary comprising a diffuser, wherein the diffuser includes a honeycomb structure, comprising a plurality of foils and structured separating layers, which foils are fused to one another at various bonding locations, the bonding locations being separated from one another by the structured separating layers provided on at least one side of each foil.

* * * * *